United States Patent [19]
Andersson

[11] Patent Number: 5,881,759
[45] Date of Patent: Mar. 16, 1999

[54] AIR-VENTILATING VALVE

[75] Inventor: Björn Andersson, Bromma, Sweden

[73] Assignee: AB Durgo, Solna, Sweden

[21] Appl. No.: 667,800

[22] Filed: Jun. 20, 1996

[30] Foreign Application Priority Data

Jun. 22, 1995 [SE] Sweden ................................ 9502280

[51] Int. Cl.$^6$ ............................ F16K 15/08; F16K 51/00
[52] U.S. Cl. ...................... 137/246; 137/516.27; 137/526
[58] Field of Search .............................. 137/526, 516.27, 137/246

[56] References Cited

U.S. PATENT DOCUMENTS

| Re. 35,532 | 6/1997 | Duren | 137/526 |
|---|---|---|---|
| 1,578,766 | 3/1926 | Schwemlein | 137/526 X |
| 1,664,963 | 4/1928 | Atwell | 137/526 X |
| 4,436,107 | 3/1984 | Persson | 137/526 X |
| 4,444,219 | 4/1984 | Hollenstein | 137/246 |
| 4,535,807 | 8/1985 | Ericson | 137/526 X |
| 4,890,637 | 1/1990 | Lamparter | 137/246 |
| 5,048,562 | 9/1991 | Frawley | 137/526 X |
| 5,273,068 | 12/1993 | Duren | 137/526 |

Primary Examiner—John Rivell
Attorney, Agent, or Firm—Jacobson, Price, Holman & Stern, PLLC

[57] ABSTRACT

An air-ventilating valve is adapted to allow the ambient atmosphere to enter a conduit when the ambient pressure exceeds the pressure of gas in the conduit by a essentially predetermined amount, and which also blocks the release of gas from the conduit to the ambient atmosphere. The valve includes two generally coaxial upstanding valve seat projections (6, 7) which lie essentially in a mutually common plane, and a vertically movable valve body (20) which includes a ring-shaped sealing element (4) which bridges an annular gap (5) between the upstanding projections (6, 7) when the valve is closed and sealingly abuts respective sealing projections (6; 7). The valve body (20) is adapted to move to a valve closed position under the influence of gravity. At least one upstanding projection (6, 7) is formed by two radially separated ridges (31, 32) which define an annular trough (33) therebetween. The ridges (31, 32) are both intended to lie essentially tangential to the sealing element (4) when the valve is closed.

16 Claims, 1 Drawing Sheet

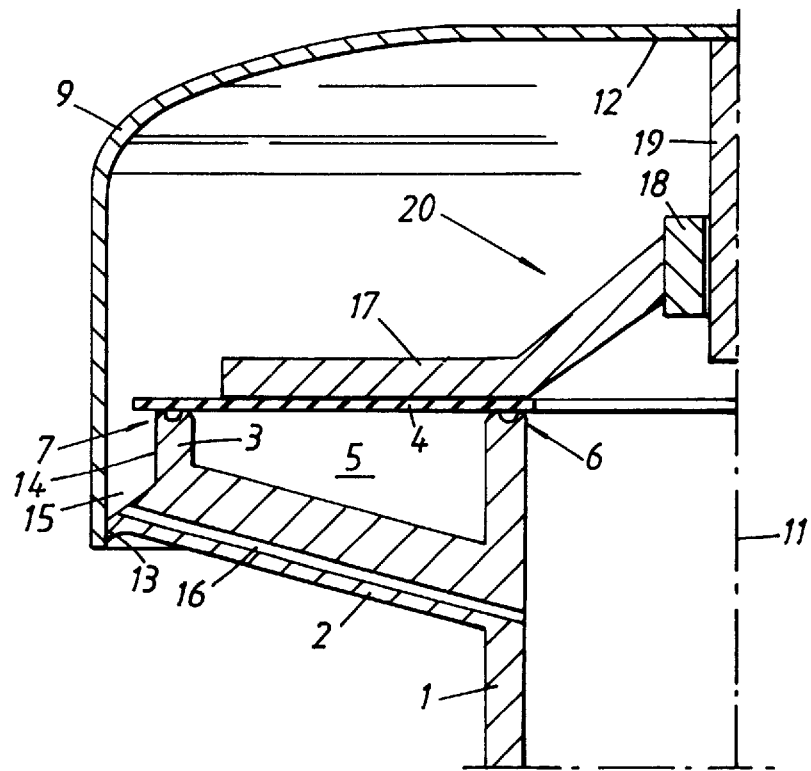
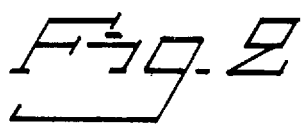
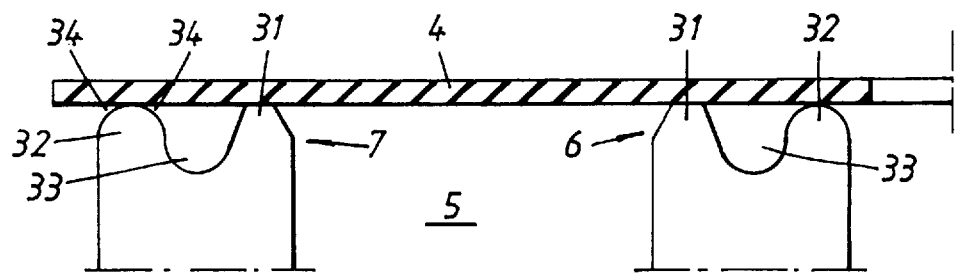

AIR-VENTILATING VALVE

BACKGROUND OF THE INVENTION

The present invention relates to an air-ventilating valve which functions to allow surrounding atmosphere to enter a conduit or pipeline, when the surrounding pressure exceeds the atmospheric pressure in the conduit by a predetermined amount, and to block the release of moist and warm air in relation to the surrounding atmosphere from the conduit to said surrounding atmosphere. The valve includes two coaxial and upstanding seat projections, each of which lies essentially in a common plane, and a vertically movable valve member which includes an annular sealing element. The sealing element bridges a throughflow gap between said projections when the valve is closed and lies sealingly against respective sealing projections. The valve member is arranged to move to a valve closed position under the influence of gravity.

Air-ventilating valves of the kind concerned are well known and find use, e.g., in the upper end of waste pipes or soil pipes, primarily to prevent odors from escaping via the upper end of the soil pipe or waste pipe. In this regard, the upper end of the soil pipe (and the ventilating valve) can be positioned inwardly of the outer roof of the building concerned, for example in the attic or loft, so as to obviate the need of providing a pipe lead-through to the outside of the roof. The ventilating valve is also constructed to allow air to enter the pipe when the need arises, for instance as a result of a subpressure generated in the pipe after having flushed a water closet connected thereto.

It will be understood, however, that ventilation valves of the kind concerned find use in many other situations in which there is an interest in preventing the departure of gas from a pipeline or conduit and where it is necessary, at the same time, to be able to allow gas to enter the conduit when the level of pressure therein falls beneath the pressure of the ambient atmosphere to a given extent.

To ensure the greatest possible reliability of the valve in operation, the valve is normally constructed so that the valve member will move to its valve closing position solely under the influence of gravity. In the case of small ventilating valves, for instance valves having an outer diameter in the order of 13–50 mm, the fact that the valve body is light in weight means that the gravitationally effected closing force becomes too weak. Another drawback is that the valve-member sealing element, a rubber plate or washer, cannot be made soft or pliable at a free-supporting rim part to compensate for the small closing force, because the one outer free-supporting rim part of the washer is then able to snap passed its sealing ridge already at relatively low over-pressures in the conduit relative to the surrounding atmosphere. It is not appropriate to increase the weight of the valve member, because of inertia.

Consequently, it has been preferred in practice to also fit a spring in the valve to supplement the effect of the gravitational force in achieving desired sealing/valve-closing conditions, particularly in the case of small valves. Although the spring ensures an effective sealing action, it adds to the magnitude of the pressure difference required to open the valve.

SUMMARY OF THE INVENTION

The prime object of the present invention is to provide improved sealing between the upstanding seat projections and the sealing washer or plate in valves of the aforesaid kind. This object also includes removal of the need of an auxiliary valve-closing spring in small valves.

The invention provides particular advantages in association with small air-ventilating valves, by virtue of obviating the need of a spring to achieve the desired sealing function, while retaining a valve body of relatively small mass. An overlapping advantage, however, resides in a general improvement of the seal.

It will be evident that the invention can also be applied effectively with larger valves.

The invention is based on the concept that at least one upstanding seat projection is formed by two radially spaced ridges which define therebetween an annular recess or trough, said ridges being disposed such that both ridges are tangential to the sealing washer or plate when the valve body is in its valve-closing position.

One feature of the invention is that if air or gas which is relatively warm and moist leaks from the interior of the conduit or pipeline into the relatively dry and cold atmosphere surrounding the valve, moisture will be condensed in the valve, for instance in the vicinity of the leakage site, this condensation being collected in the trough between the seat ridges. When the valve body is in its valve-closing position, capillary gaps are formed in or at the region of coaction between the valve seat and said sealing washer, wherewith condensation can be spread by capillary action around the region of coaction between the valve seat and the washer, whereby the condensation is also able to block gas flow through the medium of a leakage formed between the valve seat and the closed washer to the surrounding atmosphere, this leakage being the result of manufacturing tolerances, for instance.

When one of the seat ridges is given a round configuration, two zones of wedge-shaped cross-section are defined on each side of the contact line with the sealing washer, such that a capillary established liquid annulus of wedge-shaped cross-section obtains a relatively large cross-sectional area. Should the position of the valve stem deviate slightly from the vertical, condensation can nevertheless be collected in the lowest part of the annular trough between the ridges, wherein the condensation can still be sucked along the gap between the ridges and the sealing washer under the action of capillary forces when the valve is closed, thereby to establish a liquid seal filling at the location of a leakage. Because of the relatively large cross-sectional area of the wedge-shaped liquid annulus, condensation is able to flow at a relatively high speed to the upper parts of the sealing area should the valve not be positioned fully vertically.

According to one embodiment of the invention, the annular trough defined between the ridges can be filled with a liquid which has low evaporation properties, for instance a silicone oil, in the process of manufacturing the air-ventilating valve, and the sealing washer (which normally comprises EPDM rubber) can be coated with a thin coating of the same liquid/silicone oil. If, or when, the liquid evaporates in time, or disappears for some other reason, condensation can be collected to fill-out the trough.

With regard to materials and combinations thereof, the valve is constructed in a manner which will provide the best possible conditions with regard to the introduction of condensation into the trough, and with regard to causing the condensation to behave in the best possible way with regard to the sealing function.

The valves of the kind concerned here, the valve body is comprised of an elastomeric sealing plate (which in connection with petroleum products may be comprised of Viton®), which is carried/supported close to the radially inner valve seat by a holder support plate such that the sealing plate will be kept between the support plate and the valve seat. On the other hand, the sealing plate projects radially outwards passed the radially outer end of the support plate at the radially outer seat, so as to enable the shape of the radially outer rim part of the sealing plate to be adapted to said outer seat, by bending said rim part outside the outer edge of the support body. Although the length of the radially outer seat is much greater than the length of the inner seat, it is nevertheless normally possible to obtain a better sealing function at the outer seat than at the radially inner seat, or that seat where the sealing function is to the largest extent achieved by compression of the sealing plate.

With regard to the illustrated and described embodiment, it is therefore primarily suitable to arrange the inventive construction at the radially inner seat, although the inventive seal will preferably be established at both seats.

BRIEF DESCRIPTION OF THE PREFERRED EMBODIMENTS

The invention will now be described in more detail with reference to an exemplifying embodiment thereof and also with reference to the accompanying drawing, in which FIG. 1 is a schematic axial section view of one half of an inventive air-ventilating valve; and FIG. 2 illustrates schematic the construction of the valve seats.

DETAILED DESCRIPTION OF THE DRAWINGS

FIG. 1 illustrates a pipe connector 1 which supports an annulus 3 around its upper end through the medium of a plurality of circumferentially spaced spokes 2.

The pipe connector 1 is normally intended to be positioned with its axis 11 vertical, and in the illustrated embodiment a ring-shaped, flat sealing plate or disk 4 extends out in the horizontal plane, i.e. the perpendicular plane to the axis 11, such as to bridge the gap 5 between the annulus 3 and the pipe connector 1 by virtue of engagement of the upper end 6 of the pipe connector 1 and the upper end 7 of the annulus 3 with the periphery of the sealing plate 4.

A cover or casing 9 is placed coaxially with the pipe connector 1, such that the bottom inner wall-part 12 of the cover is sealingly connected with the bottom, outer wall-part 13 of the annulus 3 around the periphery thereof. A ring-shaped condensation collecting pocket 15 is disposed between the inner cover wall and the outer wall 14 of the annulus. Located at the bottom of the pocket 15 is a passageway 16 which extends obliquely down through the annulus 3 and through a spoke 2, and continues obliquely downwards through the wall of the pipe connector 1 and into the interior of said connector.

The elastomeric sealing plate 4 is carried by a ring-shaped support plate 17 provided with a central hub 18 which receives a guide pin 19 firmly mounted centrally within the cover 9. When the surrounding pressure is greater than the pressure prevailing in the pipe connector 1, the sealing plate 4 and the valve body 20 formed by said supportive plate 17, 18 will be lifted from the valve seats formed by the respective upper end parts 7 and 6 of the annulus 3 and pipe connector 1, wherewith the area of the sealing plate 4 between the seats 6 and 7 multiplied by the pressure difference shall overcome the effect of the force of gravity acting on the valve member 20. The sealing surface of the seat 7 shall lie at a slightly elevated level, so that the outer rim part of the sealing ring 4 will be bent and thereby brought into sealing contact with the seat 7.

According to the invention, at least one seat, 6, and preferably both seats, 7, is/are comprised of two radially separated ridges 31, 32 which are both intended to engage the sealing plate 4 of the valve body 20 in the closed state of the valve.

The sealing ridge 31 that lies nearest the gap 5 may have a flat top surface which provides extended surface contact with the sealing plate 4, whereas the other ridge 32 of respective seats may conveniently have a rounded top, as shown in more detail in FIG. 2. The ridges 31, 32 define therebetween an annular trough/groove 33.

Any relatively warm and moist gas/air in the interior of the pipe connector 11 that should leak into the gap 5 via the sealing plate 4 and the seat 6 or the seat 7 when the valve is closed, will be cooled as it comes into contact, either directly or indirectly, with the relatively cool surrounding atmosphere. Condensation will thereby form and be deposited in the trough 33 and there function to seal the gap causing the leakage.

As will be seen from FIG. 2, wedge-shaped gaps 34 are defined between the sealing plate 4 and the rounded ridge 32. The capillary forces generated in these wedge-shaped spaces 34 readily draw-up condensation from a low-lying part of the trough 33 (when the axis 11 of the ventilating valve is not fully vertical) along the whole of the troughs to the highest part of respective seats 6, 7.

In one embodiment of the invention, in which the outer diameter of the valve is about 40 mm, the trough 33 may have a depth of about 2 mm and a width of about 2 mm.

According to one embodiment of the invention, the trough 33 may be filled substantially completely with liquid, for instance silicone oil, in conjunction with the manufacture and delivery of the inventive valve. The sealing plate 4 may also be given a thin coating of such liquid/silicone oil.

Initially, the silicone oil will provide the desired sealing function directly, although in the passage of time some of the silicone oil in the trough 33 will, of course, disappear.

This deficiency will then be remedied either fully or partially with condensation from the moist gas/air within the valve.

The invention is also effective when the sealing plate 4 and at least one of the seats 6, 7 are not in full abutment around the entire periphery, for instance as a result of dimension tolerances in manufacture.

It will be noted in particular that the pipe connector is often fitted to the other end of a soil pipe or waste pipe which carries relatively warm and moist air that tends to rise upwards. This air is cooled by virtue of the valve being cooled by the relatively cool surrounding atmosphere, particularly at the sealing zones between the sealing plate 4 and the seats 6, 7, therewith producing condensation which sealingly fills the gaps.

An inventive valve (without silicone oil or the like) can be given an effective initial tightness immediately after fitting the valve, by spraying water onto the areas in which the sealing plate abuts the ridges.

I claim:

1. An air-ventilating valve constructed to allow surrounding atmosphere to enter a conduit when the ambient pressure exceeds the pressure of a gas in the conduit by a generally predetermined amount, and which functions to block the release of gas from the conduit to the surrounding atmosphere, wherein the valve includes radial inner and outer upstanding seat projections which lie essentially in a mutually common plane, and a vertically movable valve body that includes a ring-shaped sealing element which when the valve is closed bridges an annular through-passing gap between the inner and outer upstanding seat projections and lies sealingly thereagainst, wherein the valve body is adapted to move to its valve-closing position under the force of gravity, each of said inner and outer upstanding seat projections is formed by two radially separated ridges which define an annular trough therebetween, each trough having a substantially equal depth and arranged so as to lie essentially tangential to the sealing element when the valve is closed.

2. The valve according to claim 1, further comprising a vertically orientated pipe connector whose upper edge region forms the radially inner upstanding seat projection, and an annulus whose upper edge forms the radially outer upstanding seat projection, wherein the annulus is supported on the pipe connector by radially spaced spokes, wherein a cover is positioned with its concave side facing downwardly and having an inner wall surface whose edge part is tightly connected to the annulus around its periphery to form a circumferentially extending condensation collecting pocket between the annulus and the cover, and wherein a passageway extends from the bottom region of the pocket through at least one of said spokes and into the interior of the pipe connector, for natural drainage of condensation from the pocket.

3. The valve according to claim 1, wherein the trough between the ridges is filled initially with a liquid having low evaporation tendencies, such as silicone oil.

4. The valve according to claim 1, wherein the trough between the ridges captures condensation from the gas in the conduit.

5. The valve according to claim 3, wherein condensation from the gas in the conduit supplements the liquid with which the trough was initially filled.

6. An air-ventilating valve constructed to allow surrounding atmosphere to enter a conduit when the ambient pressure exceeds the pressure of a gas in the conduit by a generally predetermined amount, and which functions to block the release of gas from the conduit to the surrounding atmosphere, wherein the valve includes radial inner and outer upstanding seat projections which lie essentially in a mutually common plane, and a vertically movable valve body that includes a ring-shaped sealing element which when the valve is closed bridges an annular through-passing gap between the inner and outer upstanding seat projections and lies sealingly thereagainst, wherein the valve body is adapted to move to its valve closing position under the force of gravity, at least one of said inner and outer upstanding seat projections is formed by two radially separated ridges which define an annular trough therebetween and which are arranged so as to lie essentially tangential to the sealing element when the valve is closed, wherein at least one of the two ridges of at least one of said inner and outer upstanding seat projections has a rounded upper part.

7. The valve according to claim 6, further comprising a vertically orientated pipe connector whose upper edge region forms the radially inner upstanding seat projection, and an annulus whose upper edge forms the radially outer upstanding seat projection, wherein the annulus is supported on the pipe connector by radially spaced spokes, wherein a cover is positioned with its concave side facing downwardly and having an inner wall surface whose edge part is tightly connected to the annulus around its periphery to form a circumferentially extending condensation collecting pocket between the annulus and the cover, and wherein a passageway extends from the bottom region of the pocket through at least one of said spokes and into the interior of the pipe connector, for natural drainage of condensation from the pocket.

8. The valve according to claim 6, wherein one of the two ridges of said inner and outer upstanding seat projections has a generally flat top surface for flat abutment with the sealing element.

9. The valve according to claim 6, wherein the ridge having a rounded top part is located nearest the gas in the conduit.

10. The valve according to claim 6, wherein the ridge having a rounded top defines by virtue of its rounded profile wedge-shaped capillary gaps in the immediate outer vicinity of the region of contact between the sealing element and the ridge, on at least one side of said contact region.

11. The valve according to claim 6, wherein the trough between the ridges is filled initially with a liquid having low evaporation tendencies, such as silicone oil.

12. The valve according to claim 6, wherein the trough between the ridges captures condensation from the gas in the conduit.

13. The valve according to claim 6, wherein condensation from the gas in the conduit supplements the liquid with which the trough was initially filled.

14. An air-ventilating valve that allows surrounding atmosphere to enter a conduit when the ambient pressure exceeds the pressure of a gas in the conduit by a predetermined amount and blocks the release of gas from the conduit to the surrounding atmosphere, the valve comprising:

inner and outer upstanding seat projections which are radial and lie essentially in a mutually common plane;

a vertically movable valve body having a ring-shaped sealing element which, when the valve is closed, bridges an annular through-passing gap located between the inner and outer upstanding seat projections and lies sealingly thereagainst, wherein the valve body closes under the force of gravity; and two radially separated ridges located on each of said inner and outer upstanding seat projections and defining an annular trough therebetween, each trough having a substantially equal depth, the ridges lying essentially tangential to the sealing element when the valve is closed.

15. The valve according to claim 14, wherein at least one of the ridges of at least one of said inner and outer upstanding seat projections has a rounded upper part.

16. The valve according to claim 14, wherein one of the ridges of said inner and outer upstanding seat projections has a generally flat top surface for flat abutment with the sealing element.

* * * * *